(12) United States Patent
Ebisawa et al.

(10) Patent No.: US 6,737,459 B2
(45) Date of Patent: May 18, 2004

(54) POLYPHENYLENE ETHER GROUP RESIN COMPOSITE AND METHODS OF MAKING ARTICLES

(75) Inventors: Atsushi Ebisawa, Kyowa-machi (JP);
Takuro Kitamura, Moka (JP);
Kazunari Kosaka, Mibu-machi (JP);
Masaru Sato, Utsunomiya (JP);
Shigeru Shimizu, Ichikawa (JP)

(73) Assignee: General Electric Company, Pittsfield, MA (US)

( * ) Notice: Subject to any disclaimer, the term of this patent is extended or adjusted under 35 U.S.C. 154(b) by 122 days.

(21) Appl. No.: 10/213,930

(22) Filed: Aug. 7, 2002

(65) Prior Publication Data

US 2003/0119953 A1 Jun. 26, 2003

(30) Foreign Application Priority Data

Aug. 7, 2001 (JP) ........................................ 2001-239352

(51) Int. Cl.$^7$ ............................. C08K 5/24; C08L 73/00
(52) U.S. Cl. ........................................ 524/261; 524/508
(58) Field of Search ................................. 524/261, 508

(56) References Cited

U.S. PATENT DOCUMENTS

| | | | | |
|---|---|---|---|---|
| 2,393,967 A | | 2/1946 | Brubaker | ...................... 260/80 |
| 5,330,596 A | * | 7/1994 | Gusavage et al. | ............. 156/78 |
| 5,688,002 A | | 1/1999 | Noguchi et al. | |
| 6,093,760 A | * | 7/2000 | Nishihara et al. | ........... 524/145 |
| 6,098,649 A | | 8/2000 | Noguchi et al. | |

* cited by examiner

Primary Examiner—Kriellion A. Sanders

(57) ABSTRACT

A polyphenylene ether group resin composite can comprise: polyphenylene ether group resin, flame retardation reagent, and recovered polystyrene group resin. The recovered polystyrene group resin can be recovered using limonene or thermal shrinkage recovery, and can comprises polystyrene that has been recovered from a product or a part of a product that has been used by an end customer for a period of time.

21 Claims, No Drawings

POLYPHENYLENE ETHER GROUP RESIN COMPOSITE AND METHODS OF MAKING ARTICLES

CROSS REFERENCE TO RELATED APPLICATION

This application claims priority to Japanese Patent Application No. JP2001-239352, filed on Aug. 7, 2001, which is incorporated herein in its entirety.

TECHNICAL FIELD

This disclosure relates to polyphenylene ether group resin composite containing recovered polystyrene group resin.

BACKGROUND OF THE INVENTION

The polyphenylene ether (PPE) group resin composite is widely known as the resin having excellent anti-thermal characteristic, mechanical properties as well as electrical properties. It is being widely used as denatured polyphenylene ether group resin composite having its processability reformed by compounding it with polystyrene, rubber modified polystyrene (high impact polystyrene), etc. Such PPE group resin composites are being widely used in the fields of automobile parts, electric parts, office devices, etc., due to their excellent properties mentioned above.

As regards the polystyrene resin that is compounded with the polyphenylene ether group resin, virgin resin material was used. In the case of polystyrene group resin used in plastic parts, foaming styrol, etc., when a certain durability period is exceeded in the market, it is usually discarded, and replaced it with a new product. The end products of molding that get generated at the time of carrying out molding, or the inferior molded product that can be recycled, etc., are treated as the so-called recycled products in the factory. However, the number of products receiving such a treatment is insignificant if seen from the point of the total number of such products. If the polystyrene group resin is recovered from the market after it has completed its useful life, there would be an effective use of resources.

The authors carried out an earnest research on the use of such polystyrene group resin recovered from the market. They showed that if the recovered polystyrene group resin was used instead of virgin polystyrene group resin in the polyphenylene ether group resin composite and moreover, if flame retardation reagent was used jointly with it, then a composite having properties similar to that of polyphenylene ether group resin composite of the past can be obtained.

SUMMARY OF INVENTION

This disclosure is directed to polyphenylene ether group resin composites in which recovered polystyrene group resin, which has been discarded in the past, is effectively used, and articles made from embodiments of the polyphenylene ether group resin composite.

In one embodiment, a polyphenylene ether group resin composite can comprise: polyphenylene ether group resin, flame retardation reagent, and recovered polystyrene group resin. The recovered polystyrene group resin can be recovered using limonene or thermal shrinkage recovery, and can comprises polystyrene that has been recovered from a product or a part of a product that has been used by an end customer for a period of time.

One embodiment of a method for making an article comprises: dissolving a polystyrene group resin product that has been used as a product by an end customer for a period of time in a terpene group material, recovering polystyrene group resin from the polystyrene group resin product, melt blending the recovered polystyrene with polyphenylene ether group resin, flame retardation reagent, and additive, wherein the parts by weight are based upon a total of 100 parts by weight of polyphenylene ether group resin, recovered polystyrene group resin and any virgin polystyrene group resin, extruding the blend, and molding the extruded blend to form an article.

Another embodiment of a method for making an article comprises: employing thermal fusion to reduce a volume of a polystyrene group resin in a polystyrene group resin product that has been used as a product by an end customer for a period of time, recovering the polystyrene group resin from the polystyrene group resin product, melt blending the recovered polystyrene with polyphenylene ether group resin, and flame retardation reagent, extruding the blend, and molding the extruded blend to form an article.

The above described and other features are exemplified by the following detailed description.

DETAILED DESCRIPTION

The polyphenylene group resin composite containing polyphenylene group resin, flame retardation reagent and recovered polystyrene group resin. The recovered polystyrene group resin is the polystyrene that has been recovered from market and that has been used for a fixed period as a product or as a part of the product in the market. Furthermore, the recovered polystyrene group resin includes polystyrene recovered by using limonene or the polystyrene recovered by thermal shrinkage recovery. The polystyrene group resin preferably has at least one type of polystyrene chosen from a group formed from the homo polystyrene, rubber modified high impact polystyrene, and polystyrene possessing a syndiotactic structure within the same. Optionally, the composite can additionally comprise a drip prevention reagent.

The composite may further comprise at least one type of additive. Additives include rubber substances, fiber form fillers, non-fiber form fillers, olefin group polymers, alicyclic saturated hydrocarbon resins, higher grade fatty acid esters, terpene variety, waxes, petroleum hydrocarbon variety, aromatic hydrocarbon groups, petroleum resins, polyoxy alkylenes, fluorine group resins, antistatic reagents, ultraviolet rays absorption reagents, and pigments.

The molded material can be formed from the polyphenylene ether group resin composite. The molded material can be used in various applications such as the fields of domestic electric appliances, OA devices, electric and electronic parts, construction materials, daily necessities, toys, game machines, miscellaneous goods, automobile parts, pipes, communication devices, and information management transmission parts.

There is no particular restriction over the material that can be used as polyphenylene ether group resin (PPE group resin) in the composite; any polyphenylene ether group material can be used. For example, a polymer possessing structural units shown by the general formula (I) can be employed.

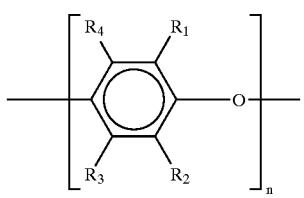

(I)

wherein each of the $R_1$, $R_2$, $R_3$ and $R_4$ are, individually, hydrogen atom, halogen atom, hydrocarbon radical, substituted hydrocarbon radical, alkoxy radical, cyano radical, phenoxy radical, or nitro radical. n is an integer showing the degree of polymerization.

The polyphenylene ether group resin used can be in form of an independent polymer formed from one type of structural unit shown by Formula (I) or can be in the form of a copolymer having two or more than two structural units or more than two types of structural units combined.

Some examples of $R_1$, $R_2$, $R_3$, and $R_4$, include radicals such as chlorine, bromine, iodine, methyl, ethyl, propyl, allyl, phenyl, benzyl, methyl benzyl, chloro benzyl, bromo methyl, cyano ethyl, cyano, methoxy, ethoxy, phenoxy, and nitro etc.

Some examples of polyphenylene ether group resin include, poly(2,6-di methyl-1,4-phenylene) ether, poly(2,6-di ethyl-1,4-phenylene) ether, poly (2-methyl-6-ethyl-1,4-phenylene) ether, poly(2-methyl-6-propyl-1,4-phenylene) ether, poly(2,6-di propyl-1,4 phenylene)ether, poly(2-ethyl-6-propyl-1,4-phenylene) ether, poly(2,6-di methoxy-1,4-phenylene)ether, poly(2,6-di chloro methyl-1,4-phenylene) ether, poly(2,6-di bromo methyl-1,4-phenylene)ether, poly (2,6-di phenyl-1,4-phenylene)ether, poly(2, 6-di toluyl-1,4-phenylene) ether, poly(2,6-di chloro-1,4-phenylene)ether, poly(2,6-di benzyl-1,4-phenylene)ether, and poly(2,5-di methyl-1,4-phenylene)ether, etc.

Preferably, the PPE group resin is a polymer having an alkyl radical, particularly, an alkyl radical having 1 to 4 carbon atoms as $R_1$ and $R_2$, with n preferably being more than 50. Also, regarding the PPE group resin copolymer, phenol in which alkyl has been tri-substituted in the polyphenylene ether structural units (e.g., a copolymer comprising 2,3,6-tri methyl phenol in its 1 part), can be employed.

Also, the PPE copolymer in which a styrene group compound has been grafted can be used. As regards the styrene group compound, styrene, α-methyl styrene, vinyl toluene, chloro styrene, etc., can be employed. There is no particular restriction over the viscosity of the use phenylene ether, however, its intrinsic viscosity in chloroform at 25° C. is preferably 0.10 to 0.50 deciliters per gram(dl/g).

The polystyrene group resin itself is well known and is the material possessing the structural units shown by Formula (II) in its polymer in a quantity of at least 25 percent by weight (wt %).

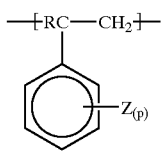

(II)

wherein, R is hydrogen atom or alkyl radical having carbon atoms from 1 to 4, Z is halogen atom or alkyl radical having carbon atoms from 1 to 4, and p is an integer from 0 to 5.

For example, the polystyrene group resin can be styrene or its derivatives such as an independent polymer as well as copolymers such as p-methyl styrene, α-methyl styrene, α-methyl-p-methyl styrene, chloro styrene, and bromo styrene, etc. Possible copolymers include polybutadiene, poly isoprene, butyl rubber, ethylene propylene diene monomer, ethylene propylene copolymer, natural rubber, and mixtures of polystyrene with natural rubbers such as epi chloro hydrine or synthetic elastomer materials copolymer containing styrene (e.g., styrene-acrylonitrile copolymer (SAN), styrene-butadiene copolymer, styrene-maleic anhydride copolymer, styrene-acrylonitrile butadiene copolymer (ABS)). The polystyrene group resin preferably comprises at least one of homo polystyrene, high impact polystyrene denatured by a rubber component, and polystyrene possessing syndiotactic structure. The polystyrene possessing syndiotactic structure is a well-known material. Preferably the polystyrene possessing syndiotactic structure having a steric dimensional chemical structure is employed with the syndiotactic structure confirmed by nuclear magnetic resonance method. A syndiotacticity of more than 50% is desired.

The weight average molecular weight of the polystyrene group resin is preferably more than 30,000 atomic mass units (amu), and more preferably more than 50,000 (amu).

If such polystyrene group resin is used along with the polyphenylene ether group resin, then the resin composite having excellent anti thermal characteristic, mechanical strength, flowability and dimensional stability can be obtained.

As regards the type of polystyrene group resin, polystyrene group resin recovered from discarded molded material made of polystyrene group resin is used. The molded materials can comprise additives, such as flame retardation reagent, etc., can be surface metal plated or coated materials, or can be foaming materials.

The foreign matter contained in the discarded molded product is preferably removed by crushing the molded material and passing it through a screen mesh. For example, passing through a screen mesh may be performed at the time of crushing and sorting the discarded plastic or at the time when it is crushed in preparation for extrusion pelletization. Any of these methods can be used where additional removal of foreign matter is desired, it can be passed through the screen mesh along with performing these two processes. The pore opening diameter of the mesh changes depending upon the desired degree of filtering, with more than 10 mesh as per JIS standard preferred. The crushed material of the discarded molded product can be used in the preparation of the composite as it is. However, since the shape of the crushed material can create problems in the extrusion feed process, it is desired to crushed the crushed material until the major axis of the crushed particles is less than 30 millimeters (mm).

Also, since the discarded molded product generally comprises environmental substances (e.g., dust, oil, etc.) adhered thereto, its surface can be washed by various methods. Some possible washing methods include dry washing method, air blowing, and/or moisture type washing method (e.g., using water, organic solvent, or surface activating reagent).

It is further preferred to remove metal fragments from the crushed material. Due to the molded product's use and/or the polystyrene recovery process, the crushed material can comprise metal fragments that can adversely effect the properties of the PPE resin composite and/or damage the extruder during processing of the composite. Consequently, metal fragments are preferably removed. Also, the metal impurity can also be separated by passing it through the screen mesh using extrusion machine at the time of preparing the composite.

Alternatively, the recovered polystyrene group resin, particularly foaming polystyrene and the like, (i) by using a solvent that dissolves the recovered polystyrene group resin, or (ii) by thermal shrinkage recovery. Possible solvents that dissolve polystyrene include organic solvents from the aromatic hydrocarbon group, halogenated hydrocarbon group, ester group, terpene group, etc. For examples, different varieties in the terpene group can be employed, such as pinene variety, limonene variety, di terpene variety, etc., with the limonene group belonging to mono terpene preferred from the point of practicality. Recovered polystyrene dissolved in limonene can be separated and recovered by distillation process. Also, limonene recovered by distillation can be re-used.

The thermal shrinkage recovery method comprises reducing the volume of the recovered polystyrene by carrying out thermal fusion. The polystyrene is recovered by forming blocks.

In the resin composite the, PPE group resin and recovered polystyrene group resin can be compounded in a desired proportion. Preferably, the compounding can comprise 5 to 95 parts by weight of recovered polystyrene group resin and 5 to 95 parts by weight of PPE group resin.

The recovered polystyrene group resin can be entirely recovered polystyrene group resin partially recovered polystyrene group resin, with the remaining part being unused (virgin) polystyrene group resin.

If the recovered polystyrene group resin contains small quantity of impurities, it can be used instead of Virgin material. However, if it has large content of impurities or if its hue has lowered, then the recovered polystyrene group resin preferably comprises less than 80 wt %, more preferably less than 50 wt % of the total weight of the polystyrene in the composition.

The composition also comprises a flame retardation reagent, such as phosphorus group, silicone group, or metal salt group, which can be used individually or in combination. In the phosphorus group, for example, phosphate (and phosphonate) compounds known as flame retardation reagent can be used such as those shown by the Formula (c-1)

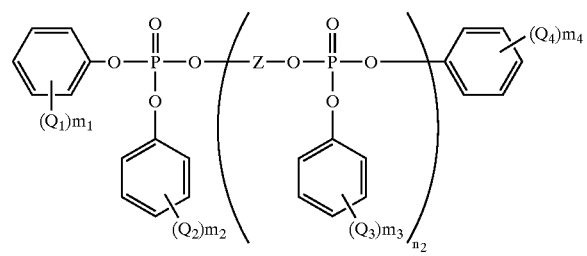

wherein, each of $Q_1$, $Q_2$, $Q_3$ $Q_4$ are independently alkyl radicals having carbon atoms from 1 to 6. Each of $m_1$, $m_2$, $m_3$ and $m_4$ are individually integers from 0 to 3 n2 is an integer from 0 to 3, and Z is a radical compressing an aromatic ring. For example n2 is an integer from 1 to 3, Z can be the radical shown by Formulae (c-2) to (c-4).

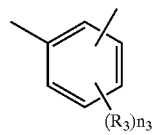

(c-2)

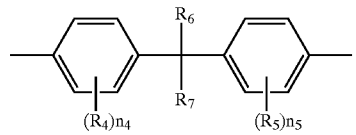

(c-3)

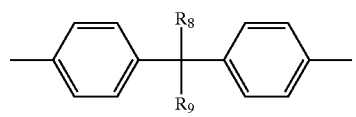

(c-4)

wherein, $R_3$ is methyl radical, $n_3$, $n_4$, and $n_5$ are, individually, integers from 0 to 2. $R_4$ and $R_5$, $R_8$ and $R_9$ are methyl radicals and each of $R_6$ and $R_7$ is methyl radical or hydrogen. Preferably, the phosphate compound (c-1) is the phosphate compound in which the total number of carbon atoms of the substitution radical shown by $Q_1$, $Q_2$ and $Q_3$ is from 12 to 27 and each of m1, m2 and m4 are integers from 1 to 3 Some examples of this phosphate compound include tri phenyl phosphate, tris nonyl phenyl phosphate, resorcinol bis(di phenyl phosphate), resorcinol bis[di(2,6-di methyl phenyl) phosphate], 2,2-bis{4-[bis(phenoxy) phosphoryloxy]phenyl propane, 2,2-bis{4[bis(methyl phenoxy)phosphoryloxy]phenyl}, and propane, etc.

Additional possible phosphate group flame retardation reagents include tri methyl phosphate, tri ethyl phosphate, tri butyl phosphate, tri octyl phosphate, tri butoxy ethyl phosphate, tri cresyl phosphate, cresyl di phenyl phosphate, octyl di phenyl phosphate, di iso propyl phenyl phosphate, etc.; as well as halogen such as di phenyl-4-hydroxy-2,3,5, 6-tetra bromo benzyl phosphonate, di methyl-4-hydroxy-3, 5-di bromo benzyl phosphonate, di phenyl-4-hydroxy-3, 5-tetra bromo benzyl phosphonate, tris(chloro ethyl) phosphate, tris(di chloro propyl)phosphate, tris(chloro propyl)phosphate, bis(2,3-di bromo propyl)-2,3-di chloro propyl phosphate, tris(2,3-di bromo propyl)phosphate, bis (chloro propyl)mono octyl phosphate, hydro quinonyl phenyl phosphate, phenyl nonyl phenyl quinonyl phosphate, phenyl di nonyl phenyl phosphate, tetra phenyl resorcinol di phosphate, tetra cresyl bis phenol A di phosphate, tris(nonyl phenyl)phosphate, etc.; poly phosphoric acid salt; red phosphorus etc.

The flame retardant reagents can optionally be used by mixing two or more than two types.

As regards the silicone group flame retardation reagent, examples include the polymer formed by polymerizing at least one of the 4 siloxane units (M unit, D unit, T unit, Q unit) shown below.

| M unit | D unit | T unit | Q unit |
|---|---|---|---|
| $R_3SiO_{0.5}$ | $R_2SiO_{1.0}$ | $RSiO_{1.5}$ | $SiO_{2.0}$ | wherein R is alkyl radical (such as methyl radical, ethyl radical, propyl radical, butyl radical, and hexyl radical, etc.), alkenyl radical (such as vinyl radical, propenyl radical, and butenyl radical, etc.), alkoxy radical (such as methoxy radical, ethoxy radical, and propoxy radical) aryl radical, phenyl radical, bi phenyl radical, naphthalene radical, etc., cyclo alkyl radical (such as cyclo hexyl radical, cyclo octyl radical or the radical in which the hydrogen atom bonding with carbon atom of these radicals has been substituted by halogen atom, cyano radical, and amino radical etc.). For example, R can be chloro methyl radical, 3,3,3-tri fluoro propyl radical, cyano methyl radical, y-amino propyl radical, N-(β-amino ethyl)-y-amino propyl radical, etc. The methyl radical, ethyl radical and phenyl radical are preferred due to ease of synthesis, procurement, and stability. If R is an aryl radical (phenyl radical) is flame retardation effect can be improved.

The weight average molecular weight of the silicone group flame retardation reagent is preferably 300 amu to 6,000 amu, more preferably, 300 amu to 4,000 amu and even more preferably, it is desired to be 300 amu to 2,500 amu. If its molecular weight becomes excessively low, bleeding of organo siloxane can occur on the surface of molded material after mixing it with the resin composite, lowering the flame retardation effect. If the molecular weight becomes excessively high, then dispersion of the organo siloxane in the resin becomes difficult, lowering the flame retardation effect. Also, if the molecular weight of organo siloxane becomes excessively high, then in the case of compounding it with polycarbonate resin, transparency of the polycarbonate resin drops.

The organo siloxane containing alkoxy radical used preferably doesn't contain a silanol radical (SiOH).

Examples of the metal salt group flame retardation reagent include one or more per fluoro alkane sulfonic acid alkali (earth) metal salts. This salt is shown by Formula (III):

$$(C_nF_{2n+1}-SO_3)_m-M \qquad (III)$$

wherein, n is an integer from 1 to 10, M is alkali metal or alkaline earth metal, and m is the integer having value similar to the valency of M. Preferably, the number of carbon atoms is 1 to 8.

Possible examples of per fluoro alkane sulfonic acid, per fluoro methane sulfonic acid, per fluoro ethane sulfonic acid, per fluoro propane sulfonic acid, per fluoro butane sulfonic acid, per fluoro methyl butane sulfonic acid, per fluoro hexane sulfonic acid, per fluoro heptane sulfonic acid, and per fluoro octane sulfonic acid, etc.

Possible examples of alkali metals or alkaline earth metals shown by M in Formula (III) include, lithium, sodium, potassium, and cesium, etc. (alkali metals), and magnesium, calcium, strontium, and barium, etc. (alkaline earth metals), with potassium particularly preferred.

The flame retardation reagents can be used individually or in combination.

The amount of flame retardation reagent is preferably 0.1 to 50 parts by weight, and more preferably 0.1 to 30 parts per weight based upon the total of 100 parts by weight of polyphenylene ether group resin and polystyrene group resin (including recovered polystyrene group resin and virgin polystyrene). In the case of phosphorus group flame retardation reagent, it can be present in an amount of 3 to 50 parts by weight, with 5 to 30 parts by weight preferred.

The composite can further comprise a drip prevention reagent, that is, an additive having the function of controlling drip occurring at the time of combustion. The material forming fibril structure in the polycarbonate group resin represented by poly tetra fluoro ethylene (PTFE) can be employed due to its high drip controlling effect and ability to produce an excellent flame retardation characteristic.

Among the poly tetra fluoro ethylene (PTFE), is preferably added as a material having excellent dispersion characteristic. For example, PTFE can be dispersed by emulsifying it a solvent (such as water, etc.), or it can be provided as a material in which capsulation treatment has been carried out over PTFE by resin represented by PPE or styrene-acrylonitrile copolymer. Such PTFE materials give good external appearance to the molded material formed from PPE composite.

Although, there is no particular restriction on the PTFE if a material in which PTFE can be dispersed by emulsification is employed, the PTFE preferably has an average particle diameter of less than 1 micron, with an average particle diameter of less than 0.5 micron more preferred.

Some examples of commonly available PTFE include Teflong 30J (trademark, Mitsui Dupont Fluoro Chemicals (Kabushiki Kaisha (Mitsui Dupont Fluoro Chemicals Co. Ltd.))), Polyflon D-2C (trademark, Daikin Kagaku Kogyo (Kabushiki Kaisha (Daikin Chemical Industries Co. Ltd.))), and Aflon AD 1 (trademark, Asahi Glass (Kabushiki Kaisha (Asahi Glass Co. Ltd.)).

Also, poly tetra fluoro ethylene can be manufactured by well-known methods (refer to U.S. Pat. No. 2,393,967). For example, free radical catalyst (e.g., sodium, potassium or ammonium peroxy di sulfate, etc.) is used to polymerized tetra fluoro ethylene in an aqueous solvent under pressure of 100 to 1,000 pounds per square inch (psi) and a temperature of 0 to 200° C., preferably 0 to 100° C., producing poly tetra fluoro ethylene as white solid.

The poly tetra fluoro ethylene preferably has a weight average molecular weight of more than 100,000, more preferably in the order of 200,000 to 3,000,000.

The drip prevention reagent can be present in an amount of 0.01 to 5 parts by weight with 0.05 to 3 parts by weight preferred, based on the total of 100 parts by weight of polyphenylene ether group resin and polystyrene group resin (including recovered polystyrene group resin and virgin material).

A resin composite comprising poly tetra fluoro ethylene compounded controls the drip occurring at the time of combustion. Furthermore, if both poly tetra fluoro ethylene and silicone resin are used, the drip is further controlled and, moreover, combustion time is shortened as compared to the case of only adding poly tetra fluoro ethylene.

In addition to the above, the composite can further comprise at least one additive comprising a rubber substance, a fiber form filler, a non-fiber form filler, an olefin group polymer, an alicyclic saturated hydrocarbon resin, a higher grade fatty acid ester, a terpene variety, waxes, a petroleum hydrocarbon variety, an aromatic hydrocarbon group petroleum resin, a polyoxy alkylene, a fluorine group resin, an antistatic reagent, an ultraviolet rays absorption reagent, and a pigment.

The rubber substance comprises a polymer having glass transition temperature of more than −100° C. and less than 50° C. or the copolymer formed by copolymerizing this polymer and an isoprene group, a butadiene group, an olefin group, a polyester elastomer group, and/or acryl group, for example. These can be used as homo polymer or can be used as copolymer.

The butadiene group copolymer can be a styrene-butadiene copolymer or a hydrogenated styrene-butadiene copolymer.

Furthermore, a copolymer having 3 elements as the acid component can also be used, e.g., acrylic acid-butadiene-styrene copolymer, and acid component containing carbonic acid/carbonic acid anhydride-butadiene styrene copolymer, etc.

Examples of the olefin group rubber substance include ethylene group, propylene group and ethylene-propylene copolymer formed by combining these two. Also, olefin group rubber component mixed or reacted with an acid component similar to butadiene group rubber substance can also be used. An olefin group rubber component containing epoxy radical can also be used.

The particular fiber shaped filler depends upon the desired strength of the molded product. Typically, a material having the aspect ratio of 2 to 1,000 can be used. Some examples include, glass fibers, hollow glass fibers, carbon fibers, hollow carbon fibers, titanium oxide whiskers, and wollastonite fibers.

The non-fiber form filler provides strength and dimensional stability simultaneously. This filler can be used in various forms, including, sheet form, particle form or amorphous form. Some examples of non-fiber form filler include, talc, clay, silica, glass flakes, glass beads, and hollow fillers, etc., the filler can be used independently or in combination.

The olefin group polymer is useful for chemical resistance and mold releasing (mold lubrication). Homo polymers such as polyethylene, polypropylene, and polybutene can be used independently or in combination. Any of the types such as high density type, low density type, chained type, or branched type can be used. It can be also used as a copolymer formed with another compound. For example, a copolymer with compound containing carbonic acid radical (such as maleic acid, citric acid, or their anhydrides), or acid compound containing acrylic acid radical (such as acrylic acid ester, etc.) can be used.

The alicyclic saturated HC resin is a hydrogenated aromatic hydrocarbon resin. The aromatic hydrocarbon resin can be C9 hydrocarbon resin, C5/C9 hydrocarbon resin, indene-chroman resin, vinyl aromatic resin, and terpene-vinyl aromatic resin, etc. The hydrogen addition ratio in the hydrogenated aromatic hydrocarbon resin is preferably at least 30%. If the quantity of the aromatic component is present in a greater amount, then other properties can be lost.

The terpene variety can be formed using α-pinene, β-pinene, and di terpene variety. Further, the terpene can include aromatic hydrocarbon (phenol, bis phenol A, etc.) modified terpene or hydrogenated terpene, etc.

The wax can include olefin group wax, and montan wax, etc., such as low molecular weight polyethylene, etc.

The petroleum hydrocarbon variety can be liquid form petroleum fraction.

The aromatic hydrocarbon petroleum resin can be aromatic hydrocarbon fraction polymer represented by C9 carbon.

The polyoxy alkylene can be poly alkylene glycol, such as, polyethylene glycol, and polypropylene glycol, etc.

The fluorine group resin can be poly tetra fluoro ethylene.

Antistatic reagent can be a compound that absorbs moisture on the surface of the molded material. As an additive in the resin, the antistatic reagent can be attached by secondary processes, e.g., coating, etc. The additive can be material that accelerates moisture absorption, e.g., poly alkylene glycol or compounds containing a sulfonic acid radical.

The ultraviolet rays absorption reagent can be a hindered amine group, benzo triazole group, benzophenone group, and epoxy group, etc. These can be used independently or in combination.

Preferably, these additives are present in an amount of 0.01 to 70 parts by weight with respect to the total of 100 parts by weight of polyphenylene ether group resin and polystyrene group resin (including recovered polystyrene group resin and virgin material), with 0.1 to 50 parts by weight more preferred.

The resin composite can be made by various methods such as the fusion mixing method, with a solvent optionally used in a small quantity. The equipment, e.g., extrusion machine, bombarding mixer, roller, or kneader, etc., and can be operated in batch or continuous process, and the components can be mixed in any order.

For example, in the case of fusion kneading using extrusion machine, etc., the components can be compounded and kneaded. Multiple feed ports can be set up in an extrusion machine to feed the components. The resulting resin composite can be directly molded or can be cooled and solidified and made into pellets, powder, etc. Additives can then be added to the pellets, powder, etc., and fused again.

The molding method can be any method for molding polyphenylene ether group resin composite. For example, the molding method, can be injection molding, extrusion molding, vacuum, or compression molding, etc.

The molded material formed from the polyphenylene ether group resin composite can be used in various applications such as domestic electric appliances, office automations (OA) devices (e.g., fax machines, etc.), electric and electronic parts, construction materials, daily necessities, toys, game machines, miscellaneous goods, automobile parts, pipes, communication devices, and information management transmission parts. Particularly, the molded material can be used in television housing, television chassis, deflation shock, other television parts, AC adaptor, electricity source box, air conditioner parts, audio parts, radiator cover, monitor housing, monitor chassis, PC housing, PC battery, liquid crystal projector housing, PDA housing, antenna cover, printer housing, printer chassis, toner cartridge, ink tank, paper supply tray, scanner housing, scanner chassis, and portable telephone housing, portable telephone batter, etc.

Further, it can be used in bathtub parts, shower head, pump housing, parts of air purifier, sizing, parts used in kitchens, pipes, gutter, sound barrier walls, window frame, sash, parts of signaling machine, computer parts, toys, TV game machines, materials used in sports, gardening tools, fishing tackle, pipes, foodstuff containers, cosmetic containers, and machine covers, etc.

Other examples include the information transmission machines, communication devices, terminal adaptor, router, modem, table guide, electric wiring insulation parts, digital camera circumference parts, and flash memory card parts, etc.

Further automobile part examples include instrument panel, center console, meta console, globe box, airbag, defroster garnish, air duct, heater control, steering column cover, niborster, air defroster, door trim, sunshade, roof liner, rear seat shelf, pillar cover, pillar impact absorber, bonnet air scoop, radiator grill, headlamp part, signal lamp part, fog lamp part, bumper, headlamp finisher, license plate finisher, fender, door handle, door mirror, door panel, quarter panel, rear combination lamp part, tailgate panel, trim, foil cover, side rear cover, center cap, spoiler, rear finisher, battery tray, battery housing, front end module, etc.

Recovered polystyrene group resin obtained by recovering the discarded polystyrene group molded material can be effectively used instead of virgin polystyrene, thereby effectively using resources. Also, the molded material formed therefrom possesses the same level of properties as that of the material manufactured using virgin polystyrene.

The present invention has been explained below in further details with the help of practical examples. However, the present invention is not restricted only to these practical examples.

As regards each component, the following compounds were used.

Component A (Polyphenylene Ether)

Poly(2,6-di methyl 1,4-phenylene)ether (intrinsic viscosity in chloroform at 25° C., 0.40 dl/g) (PPE-1) commonly available from Nippon GE Plastics Kabushiki Kaisha (Japan GE Plastics Co. Ltd.).

Component B (Flame Retardation Reagent)

Bis phenol A bis phosphate (trade name R741) commonly available from Daihatsu Kagaku Kogyo Kabushiki Kaisha (Daihatsu Chemical Industries Ltd.).

Component C (Recovered Polystyrene)

A television cover was recovered and metal parts were removed. It was crushed using a crusher until the size was in the order of 5 mm. It was washed with water having normal temperature after which air-drying was carried out. After this, it was passed through a metal detector and removal of the mixed metal was carried out. When the resulting crushed polystyrene was analyzed, it comprised rubber modified high impact polystyrene. Flame retardation reagent was not observed.

Component D (Virgin Polystyrene)

High impact polystyrene (HIPS) Topolex 870ST commonly available from Nippon Polystyrene Kabushiki Kaisha (Japan Polystyrene Co. Ltd.).

Component E (Rubber Component)

Styrene-butadiene block copolymer, Kraton G-1651, commonly available from Shell Kagaku Kabushiki Kaisha (Shell Chemicals Co. Ltd.).

Component F (Alicyclic Saturated Hydrocarbon Resin)

Hydrogenated C9 aromatic hydrocarbon resin, Arkon P125 commonly available from Arakawa Kagaku Kogyo Kabushiki Kaisha (Arakawa Chemical Industries Ltd.).

Component G (Poly Tetrafluoroethylene)

Poly tetra fluoro ethylene, Teflon® 30 J, commonly available from Mitsui Dupont Fluoro Chemical Kabushiki Kaisha (Dupont Mitsui Fluoro Chemical Co. Ltd.).

Each of the components were fusion kneaded, in the proportion given in Table 1, using a biaxial extrusion kneading machine (screw diameter 50 mm) under a barrel fixed temperature of 260° C. Pellets (cylinder having a 3 mm diameter and a x3 mm length) were prepared. Different test plates were prepared from the obtained pellets by injection molding. The plates were evaluated.

Izod impact strength: It was measured by attached notch having thickness of 3.2 mm as per ASTM D256.

Tensile strength: Measurement was carried out as per ASTM D638.

Tensile elongation: Measurement was carried out as per ASTM D638.

Thermal deformation temperature: It was measured as per ASTM D648 at the load of 18.6 kg/cm$^2$.

Flame retardation characteristic: Measurement was carried out as per testing method indicated in Bleten 94 "Combustion test for material classification" of the Under Writer Laboratory Incorporation (commonly referred to as UL-94). Measurement was taken 5 times using 5 units of test plates having thickness of 1.6 mm. Regarding 1 test plate, the operation of measuring combustion time after contact burning of 10 seconds was repeated twice. The result of flame retardation characteristic was classified into V-0, V-1, V-2, HB by UL 94 standard.

Melt flow index: It was measured as per ASTM D1238. The measurement conditions were cylinder temperature of 200° C. and load of 2.16 kg.

The results have been presented in Table 1 below where "CE" represents comparative example while "PE" represents practical example.

TABLE 1

| | CE 1 | CE 2 | CE 3 | PE 1 | PE 2 | PE 3 | PE 4 | PE 5 | PE 6 | PE 7 | PB 8 | PE 9 |
|---|---|---|---|---|---|---|---|---|---|---|---|---|
| COMPOSITION | | | | | | | | | | | | |
| (C) recovered polystyrene | 100 | 50 | 50 | 40 | 20 | 40 | 31 | 25 | 17 | 20 | 96 | 48 |
| (A) polyphenylene ether | | | 50 | 40 | 40 | 37 | 44 | 40 | 70 | 60 | 4 | 48 |
| (B) flame retardation reagent | | | | 20 | 20 | 20 | 20 | 15 | 13 | 7 | 10 | 4 |
| (D) high impact polystyrene | | 50 | | | 20 | | | 20 | | 13 | | |
| (E) rubber component | | | | | | 3 | | | | | | |
| (F) aromatic hydrocarbon resin | | | | | | | 5 | | | | | |
| (G) poly tetrafluoroethylene | | | | 0.3 | 0.3 | 0.3 | 0.3 | 0.3 | 0.3 | 0.3 | | |
| PROPERTIES | | | | | | | | | | | | |
| Izod impact strength (kg · cm/cm) | 5 | 8 | 6 | 10 | 12 | 13 | 9 | 10 | 10 | 11 | 5 | 9 |
| thermal deformation (° C.) | 81 | 80 | 145 | 90 | 90 | 89 | 87 | 97 | 125 | 125 | 75 | 130 |
| Flame retardation characteristic | HB | HB | HB | V-0 | V-0 | V-0 | V-0 | V-1 | V-0 | V-1 | HB | HB |
| melt flow index (g/10 min) | 5.7[*1] | 3.5[*1] | 2.1 | 6.4 | 6.6 | 6 | 9.2 | 5.5 | 1.1 | 1.6 | 8.2[*1] | 3.2 |

TABLE 1-continued

|  | CE 1 | CE 2 | CE 3 | PE 1 | PE 2 | PE 3 | PE 4 | PE 5 | PE 6 | PE 7 | PB 8 | PE 9 |
|---|---|---|---|---|---|---|---|---|---|---|---|---|
| tensile strength (kg/cm$^2$) | 300 | 280 | 450 | 480 | 478 | 475 | 470 | 470 | 520 | 500 | 330 | 460 |
| tensile elongation (%) | 20 | 35 | 30 | 33 | 35 | 38 | 40 | 35 | 38 | 47 | 15 | 39 |

(*1)Measured

It is clear from the results that a molded material having properties similar to a molded material with virgin polystyrene can be manufactured using recovered polystyrene group resin.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A polyphenylene ether group resin composite, comprising:
   polyphenylene ether group resin;
   flame retardation reagent; and
   recovered polystyrene group resin recovered using limonene or thermal shrinkage recovery, wherein the recovered polystyrene group resin comprises polystyrene that has been recovered from a product or a part of a product that has been used by an end customer for a period of time.

2. The polyphenylene ether group resin composite of claim 1, wherein the recovered polystyrene group resin further comprises at least one material selected from the group consisting of homo polystyrene, rubber modified high impact polystyrene, and polystyrene comprising a syndiotactic structure.

3. The polyphenylene ether group resin Composite of claim 1, further comprising poly tetrafluoroethylene.

4. The polyphenylene ether group resin composite of claim 3, wherein the poly tetrafluoroethylene is present in an amount of 0.01 to 5 parts by weight, based upon a total of 100 parts by weight of the polyphenylene ether group resin and the recovered polystyrene group resin and any virgin polystyrene group resin.

5. The polyphenylene ether group resin composite of claim 4, wherein the poly tetrafluoroethylene is present in an amount of 0.05 to 3 parts by weight.

6. The polyphenylene ether group resin composite of claim 4, further comprising at least one additive selected from the group consisting of rubber substance, fiber form filler, non-fiber form filler, olefin group polymer, alicyclic saturated hydrocarbon resin, fatty acid ester, terpene variety, waxes, petroleum hydrocarbon variety, aromatic hydrocarbon group petroleum resin, polyoxy alkylene, fluorine group resin, antistatic reagent, ultraviolet rays absorption reagent, and pigment.

7. The polyphenylene ether group resin composite of claim 6, comprising hydrogenated aromatic hydrocarbon resin.

8. The polyphenylene ether group resin composite of claim 1, wherein the flame retardation reagent comprises a silicone group material having weight average molecular weight of 300 to 6,000 amu.

9. The polyphenylene ether group resin composite of claim 8, wherein the molecular weight is 300 to 4,000 amu.

10. The polyphenylene ether group resin composite of claim 9, wherein the molecular weight is 300 to 2,500 amu.

11. An article formed from the polyphenylene ether group resin composite of claim 1, wherein the article is selected from the group consisting of domestic electric appliances, office automation devices, electric and electronic pans, construction materials, daily necessities, toys, game machines, miscellaneous goods, automobile pans, pipes, communication devices, and information management transmission pans.

12. A method for making an article, comprising:
   dissolving a polystyrene group resin product that has been used as a product by an end customer for a period of time in a terpene group material;
   recovering polystyrene group resin from the polystyrene group resin product;
   melt blending the recovered polystyrene with polyphenylene ether group resin, 0.1 to 50 parts by weight flame retardation reagent 0.01 to 5 parts by weight poly tetrafluoroethylene, and 0.1 to 70 pads by weight additive, wherein the pans by weight are based upon a total of 100 pans by weight of polyphenylene ether group resin, recovered polystyrene group resin and any virgin polystyrene group resin, and wherein the additive comprises at least one material selected from the group consisting of rubber substance, fiber form filler, non-fiber form filler, olefin group polymer, alicyclic saturated hydrocarbon resin, higher grade fatty acid ester, terpene variety, waxes, petroleum hydrocarbon variety, aromatic hydrocarbon group petroleum resin, polyoxy alkylene, fluorine group resin, antistatic reagent, ultraviolet rays absorption reagent, and pigment;
   extruding the blend; and
   molding the extruded blend to form an article.

13. The method of claim 12, wherein the terpene group material comprises limonene.

14. The method of claim 12, wherein recovering the polystyrene comprising distilling dissolved polystyrene.

15. The method of claim 12, wherein the flame retardation reagent comprises a silicone group material having a weight average molecular weight of 300 to 6,000 amu.

16. The method of claim 15, wherein the molecular weight is 300 to 4,000 amu.

17. The method of claim 16, wherein the molecular weight is 300 to 2,500 amu.

18. A method for making an article, comprising:
   employing thermal fusion to reduce a volume of a polystyrene group resin in a polystyrene group resin product that has been used as a product by an end customer for a period of time;
   recovering the polystyrene group resin from the polystyrene group resin product;
   melt blending the recovered polystyrene with polyphenylene ether group resin, 0.1 to 50 parts by weight flame retardation reagent, 0.01 to 5 parts by weight poly tetrafluoroethylene, and 0.1 to 70 parts by weight additive, wherein the parts by weight are based upon a total of 100 parts by weight of polyphenylene ether group resin, recovered polystyrene group resin and any virgin polystyrene group resin, and wherein the additive comprises at least one material selected from the group consisting of rubber substance, fiber form filler, non-fiber form filler, olefin group polymer, alicyclic saturated hydrocarbon resin, higher grade fatty acid ester, terpene variety, waxes, petroleum hydrocarbon variety, aromatic hydrocarbon group petroleum resin, polyoxy alkylene, fluorine group resin, antistatic reagent, ultraviolet rays absorption reagent, and pigment;

extruding the blend; and molding the extruded blend to form an article.

19. The method of claim 18, wherein the flame retardation reagent comprises a silicone group material having a weight average molecular weight of 300 to 6,000 amu.

20. The method of claim 19, wherein the molecular weight is 300 to 2,500 amu.

21. A polyphenylene ether group resin composite, consisting essentially of:

polyphenylene ether group ream;

flame retardation reagent; and recovered polystyrene group resin recovered using limonene or thermal shrinkage recovery, wherein the recovered polystyrene group resin comprises polystyrene that has been recovered from a product or a part of a product that has been used by an end customer for a period of time.

* * * * *

UNITED STATES PATENT AND TRADEMARK OFFICE
CERTIFICATE OF CORRECTION

PATENT NO. : 6,737,459 B2 Page 1 of 1
APPLICATION NO. : 10/213930
DATED : May 18, 2004
INVENTOR(S) : Ebisawa et al.

It is certified that error appears in the above-identified patent and that said Letters Patent is hereby corrected as shown below:

Title Page:
(73) Assignee, delete "Pittsfield, MA" and insert therefor -- Schenectady, NY--

Title Page (57) Abstract:
Line 5, after "can" delete "comprises" and insert therefor -- comprise --

Column 1:
Line 63, before "polystyrene" delete "comprises" and insert therefor -- comprise --

Column 4:
Line 54, after "to" delete "crushed" and insert therefor -- crush --

Column 8:
Line 34, after "it" (first occurrence) insert -- in --
Line 64, after 'to" delete "polymerized" and insert therefor -- polymerize --

Column 13:
Line 41, after "resin" delete "Composite" and insert therefor -- composite--

Column 14:
Line 19, after "automobile" delete "pans" and insert therefor -- parts--
Line 21, after "transmission" delete "pans" and insert therefor -- parts --
Line 31, after "70" delete "pads" and insert therefor -- parts --
Line 32, after "the" delete "pans" and insert therefor -- parts --
Line 33, after "100" delete "pans" and insert therefor -- parts--

Signed and Sealed this

Twenty-fourth Day of July, 2007

JON W. DUDAS
*Director of the United States Patent and Trademark Office*